(12) United States Patent
Christodoulou et al.

(10) Patent No.: US 7,230,744 B2
(45) Date of Patent: Jun. 12, 2007

(54) PERFORMANCE OF A MULTI-STAGE SERVICE WITHIN AN INFORMATION TECHNOLOGY NETWORK

(75) Inventors: Athena Christodoulou, Bristol (GB); Richard Taylor, Bristol (GB); Christopher Tofts, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 880 days.

(21) Appl. No.: 10/269,562

(22) Filed: Oct. 11, 2002

(65) Prior Publication Data

US 2003/0095275 A1    May 22, 2003

(30) Foreign Application Priority Data

Oct. 13, 2001    (GB)    ................. 0124632.1

(51) Int. Cl.
*H04N 1/41*    (2006.01)
*H04N 1/32*    (2006.01)
*G06F 3/12*    (2006.01)
*G06F 15/173*    (2006.01)

(52) U.S. Cl. ............ 358/407; 358/426.01; 358/426.02; 358/1.15

(58) Field of Classification Search ............ 358/426.02
See application file for complete search history.

(56) References Cited

U.S. PATENT DOCUMENTS

| | | | |
|---|---|---|---|
| 5,155,851 A | | 10/1992 | Krishnan |
| 5,179,637 A | | 1/1993 | Nardozzi ................. 358/1.15 |
| 5,696,598 A | * | 12/1997 | Yoshida et al. ............ 358/434 |
| 5,712,712 A | * | 1/1998 | Sayward ................. 358/403 |
| 5,987,225 A | * | 11/1999 | Okano ................. 358/1.13 |
| 6,078,919 A | * | 6/2000 | Ginzburg et al. ............ 707/10 |
| 6,222,635 B1 | * | 4/2001 | Gotoh ................. 358/1.15 |
| 6,441,920 B1 | * | 8/2002 | Smith ................. 358/1.2 |
| 6,519,053 B1 | * | 2/2003 | Motamed et al. .......... 358/1.16 |
| 6,577,407 B1 | | 6/2003 | Kopecki ................. 358/1.15 |
| 7,099,815 B2 | * | 8/2006 | Christodoulou et al. ...... 703/21 |
| 7,143,316 B2 | * | 11/2006 | Christodoulou et al. ...... 714/43 |
| 7,148,985 B2 | * | 12/2006 | Christodoulou et al. ... 358/1.15 |
| 2002/0149800 A1 | * | 10/2002 | Medina ................. 358/426.02 |
| 2002/0181019 A1 | * | 12/2002 | Christodoulou et al. ... 358/1.15 |
| 2002/0184000 A1 | * | 12/2002 | Christodoulou et al. ...... 703/22 |
| 2003/0007176 A1 | * | 1/2003 | Takamine ................. 358/1.15 |
| 2003/0016388 A1 | * | 1/2003 | Christodoulou et al. ... 358/1.15 |

(Continued)

FOREIGN PATENT DOCUMENTS

EP    0 459 931    12/1991

(Continued)

*Primary Examiner*—Twyler Lamb
*Assistant Examiner*—Myles D. Robinson

(57) ABSTRACT

A multi-stage or process operation, such as the printing of a document from a data file in the form of a word processing document may be performed either by passing the document directly along a relatively fast network link to a printer 300, or by passing the document along a relatively slow link to a printer 200, where the document is ripped, and then passing the ripped data along a further relatively fast link to printer 300. To determine the optimum course of action in view of a policy demanding speed of printing the probable speed of each course of action is determined, and the course of action most likely to yield a result in conformity with the policy is selected.

32 Claims, 4 Drawing Sheets

U.S. PATENT DOCUMENTS

| | | | |
|---|---|---|---|
| 2003/0142347 A1* | 7/2003 | Christodoulou et al. | 358/1.15 |
| 2004/0196494 A1* | 10/2004 | Binder | 358/1.15 |
| 2005/0179940 A1* | 8/2005 | Konji et al. | 358/1.15 |
| 2006/0107084 A1* | 5/2006 | Taylor et al. | 714/1 |
| 2006/0107110 A1* | 5/2006 | Taylor et al. | 714/12 |
| 2006/0129882 A1* | 6/2006 | Taylor et al. | 714/12 |

FOREIGN PATENT DOCUMENTS

| | | | |
|---|---|---|---|
| EP | 0 733 965 A1 | | 9/1996 |
| EP | 0 917 044 | | 5/1999 |
| EP | 0 578 264 | | 6/2001 |
| GB | 2380911 A | * | 4/2003 |
| GB | 2390447 A | * | 1/2004 |
| GB | 2419699 A | * | 5/2006 |
| JP | 2000-259591 | | 9/2000 |
| WO | 98/32096 | | 7/1998 |
| WO | 98/57275 | | 12/1998 |
| WO | 99/44121 | | 9/1999 |

* cited by examiner

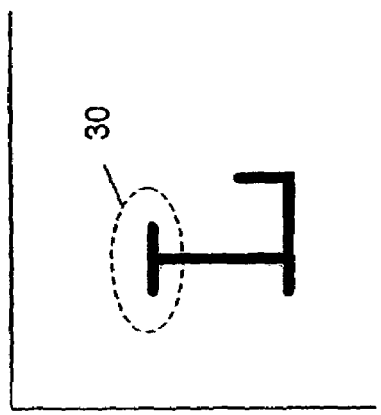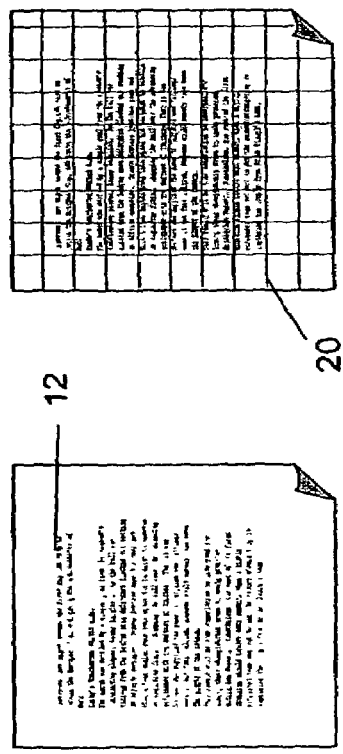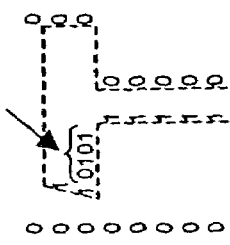

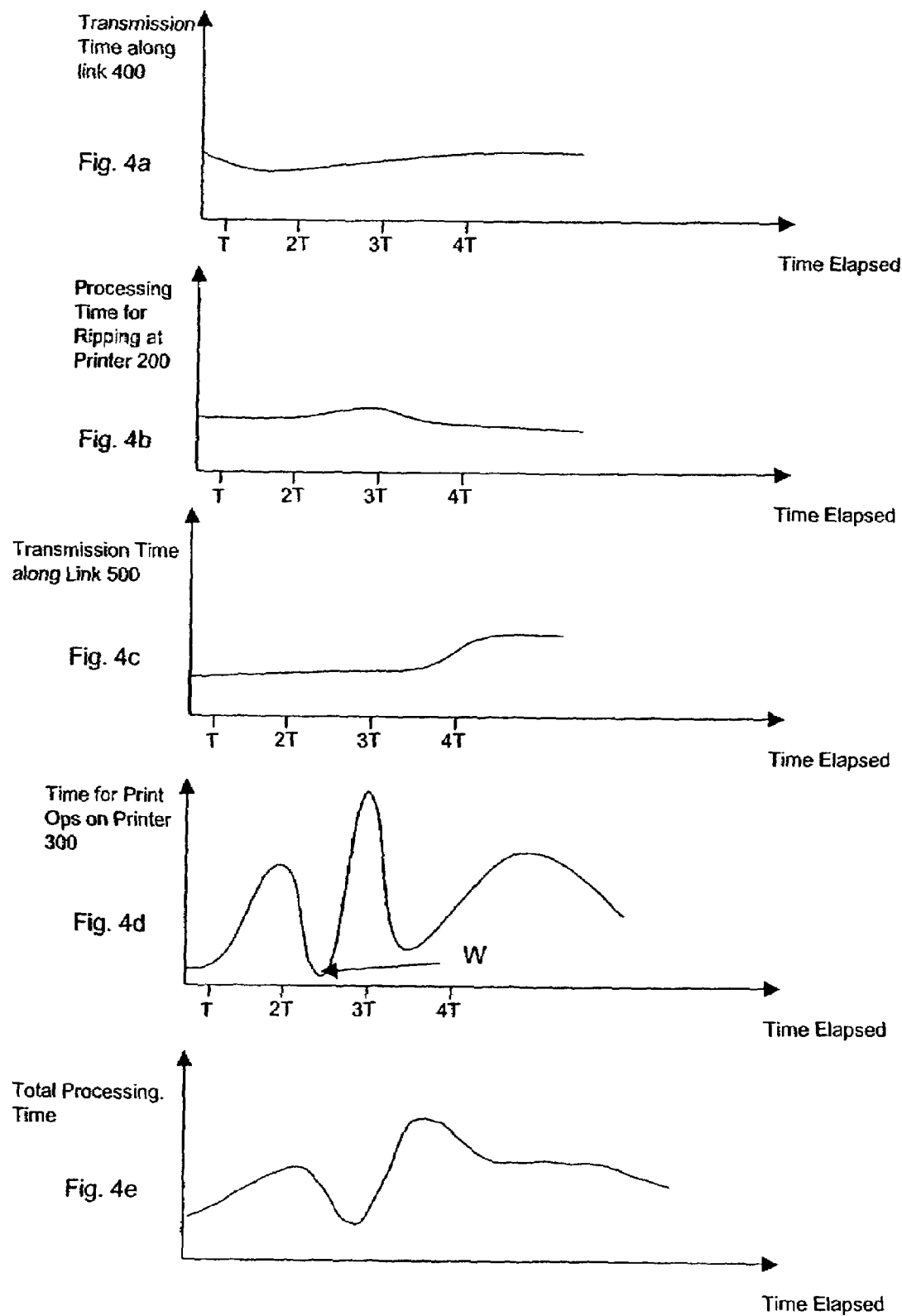

PERFORMANCE OF A MULTI-STAGE SERVICE WITHIN AN INFORMATION TECHNOLOGY NETWORK

BACKGROUND TO THE INVENTION

1. Field of the Invention

The present invention relates to the performance of a multi-stage service, such as printing of a document for example, within an information technology network.

2. Description of Related Art

The process of printing a document for example involves a plurality of computational procedures, such as translation of source data from, for example a word-processing document to a Page Control Language (PCL) file, ripping the PCL file to create a bitmap, and then operating a print engine on the basis of the bitmap to create indicia on a suitable form of print medium, such as paper. In our prior filed US patent application we disclose a manner in which certain of these procedures may be performed at different locations within an information technology network in order to optimise the efficiency of the process. The present invention relates to a manner in which the performance of a multi-stage service, such as printing, may be optimised within a network.

SUMMARY OF THE INVENTION

Accordingly, an aspect of the present invention provides a method of optimising performance of a multi-stage service on source data in a network having first and second computing entities linked by first and second network pathways enabling, for a given ratio of signal to noise, data transmission at higher and lower rates respectively, comprising the steps of:

establishing, on the basis of predetermined policy: (i) a first rating for transmitting the source data from the first to the second computing entity via the first network pathway and performance of the multi-stage service by the second computer entity; and (ii) a second rating for: transmitting the source data to a third computing entity located on the second pathway, performing at least a part of the multi-stage service at the third computing entity, subsequently transmitting data to the second computing entity along the second pathway, and performing any remaining stages of the service by the second computing entity; and selecting the pathway with the most favourable rating.

The policy may, for example, provide that the multi-stage operation be performed as quickly as possible, for example. Alternatively the policy may provide that the operation be completed at the minimum cost, or in yet a further alternative, the policy may require that both speed and cost be taken into consideration at predetermined relative weightings, e.g. with speed being determined as having greater weighting than cost by some predetermined factor. Other policies are equally applicable to the present invention.

The ratings may be generated from an analysis of historical data, or, in the event that network traffic and the operation of computing entities is controlled centrally, on the basis of data from a controlling computing entity (such as, in the case of printing, network print management software). The ratings may be simply a relative ranking, i.e. one particular option is less favourable than another, or may be an indication in respect of each alternative of the likely outcome vis-a-vis the policy, e.g. sending data on the following network pathway will take 10 seconds.

Preferably, the process of generating each rating will include consideration of several alternative scenarios, such as for example, generating a plurality of ratings for the transmission of source data along a given network pathway at a plurality of different instances in time, or the transmission of source data in a plurality of different data formats, in order to optimise the probability of generating a most favourable and yet realistic rating for a given course of action.

BRIEF DESCRIPTION OF DRAWINGS

An embodiment of the present invention will now be described, by way of example, and with reference to the accompanying drawings, in which:

FIGS. 2A–E are schematic representations of operations forming part of a print pipeline FIGS. 4A–E are graphs illustrating the process of establishing a rating for transmission of data along a further network pathway.

DESCRIPTION OF PREFERRED EMBODIMENTS

Figure 1:
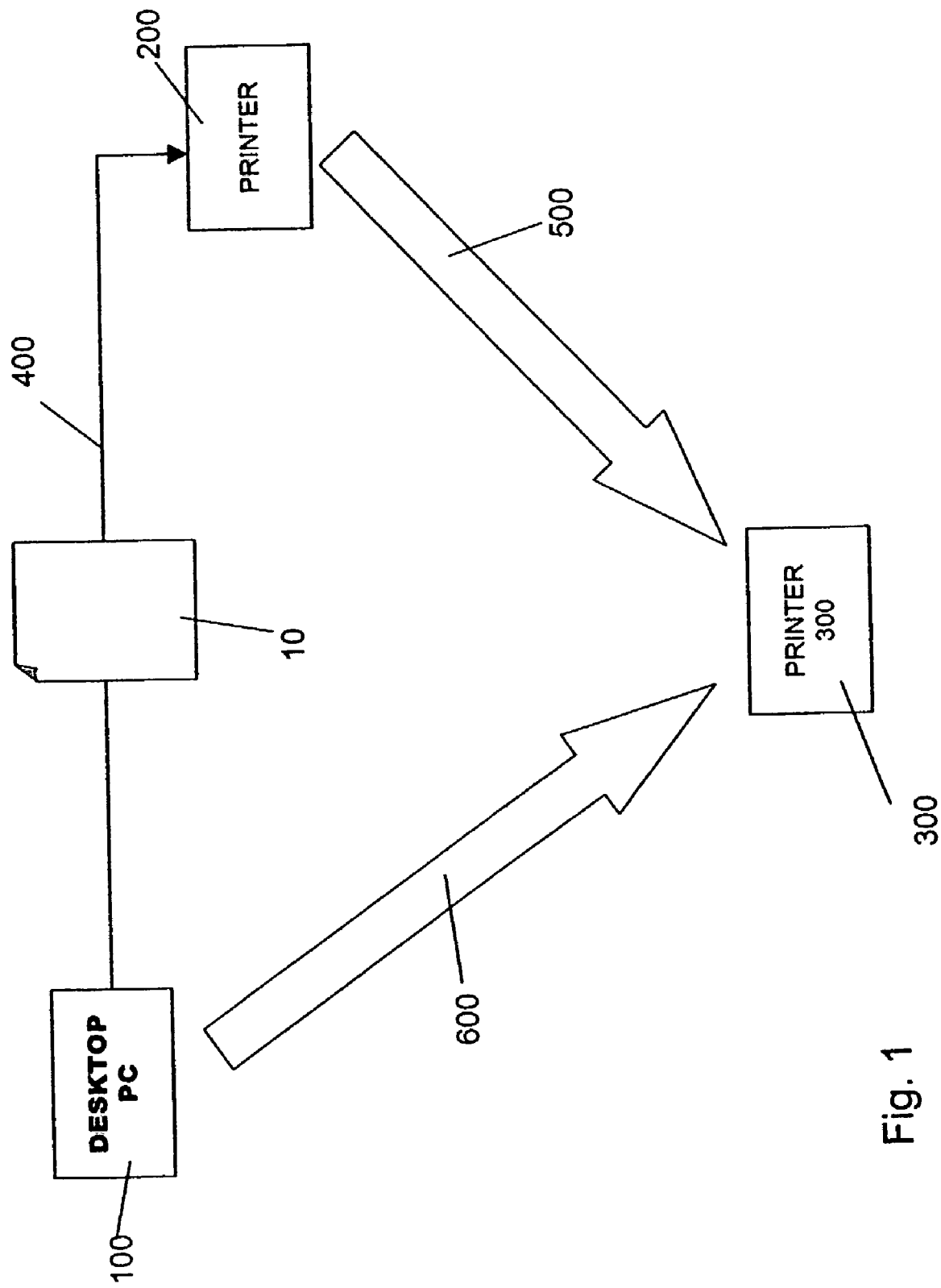
FIG. 1 is a schematic representation of a part of network including the three computing entities required in order to illustrate an embodiment of the present invention.

Referring now to FIG. 1, an information technology network includes a first, service-requesting computing entity, which in the present example is a desktop computer 100, together with second and third, service-providing computing entities which in the present example are printers 200, 300 respectively. The desktop computer and printer 200 are connected, in this example, by a relatively low speed link 400, the printers 200 and 300 are connected by a relatively high-speed link 500, and the desktop computer and printer 300 are connected by another relatively high-speed link 600. The network as thus far described may merely be a part of a larger network; the principles described in connection with the relatively simplistic network architecture illustrated in this embodiment being equally applicable to larger and more complex networks.

Referring now to FIGS. 2A–E, a document 10 contains lines of text 12, and both the text and its format on a page are stored within a source data file. The source data file of the document will typically be created by reference to the document itself, the creator of the source file using the document which is created in real time on a computer screen from the source file as visual feedback for the creation of the source file. Typically, for source files created using word processing programs, the form of the source file will be particular to the word processing program that is being used to create it, although as is well known in the art there are features which are common to virtually all such programs. For example, in accordance with an ASCII standard, each letter of the alphabet is represented by a number (e.g. the letter "a" is represented by the number 56); however particular characters used to represent different formats for such letters differ from program to program.

The creation of a printed document from a source data file involves a number of operations which collectively are known as a "print pipeline". The first operation within the print pipeline is to define a visual image of the document in a computer language called page control language (PCL for short). Referring now to FIG. 2B, this involves defining a page in accordance with a predetermined size (typically determined by the creator of the source file), and dividing the page into a grid of boxes 20, each of which contains a relatively small amount of text. The provision of a representation of the document in PCL may be described in simple terms as breaking the page down into manageable chunks, themselves defined by the boxes 20 of the grid.

Referring now to FIGS. 2C and D, each of the individual grid boxes 20 is then subject to a process known in the art as ripping. Ripping is effectively a raster scan of a grid box 20, the result of which is that the text in the box is represented as an electronic digital array of a series of "1"s and "0"s. Thus the seriph of the capital "L" highlighted within the dashed ellipse 30 in FIG. 2C is seen represented by an array of "1"s against a background of "0"s as illustrated in FIG. 2D (an outline being shown for emphasis only). The resultant digital array (or "bitmap") of numbers is then used directly to instruct the print engine where to deposit ink on a page, i.e. in the representation of FIG. 2D it is intended that ink is to be deposited by the print engine wherever there are "1"s, with the spacing between adjacent bits typically being equal to the smallest indexing movement of the print engine which is repeatably achievable. An intrinsic characteristic of the ripping process is that because of the volume of processing operations required it is not possible to determine in advance the amount of time required to rip a given PCL file. Following ripping, the ripped data is stored, typically on one or more of the storage elements of the printer which is performing the printing. The ripped data is typically stored because, given the relatively large processing time, it is desirable to perform ripping of a document only once, and it frequently occurs that the print engine is not able to act upon the ripped data in real time, e.g. because it is busy, or simply because it is not able to operate sufficiently fast to keep up with the ripping process. However storage of ripped data creates a further problem, because of the relatively large volume of data produced by the ripping process; the better the ripping process in respect of a given document the larger quantity of data that is produced, and as with the time required to complete a ripping operation, it is not possible to determine in advance the amount of data which will be produced by ripping process (there usually being an ephemeral requirement during the course of the ripping process for more storage—e.g. disk—space than simply the amount of storage space used to store the end result of the ripping process). It is thus necessary to compress the ripped data prior to storage, and an example of compressed ripped data is illustrated in FIG. 2E. The compression routine defines, for each row, the first bit of a section of the row where all subsequent bits are of the same type, and adjacent to that first bit, a binary number equal to the number of identical bits that follow in that row. Thus for example, the first bit of an exemplified part of a row in FIG. 2E is a "1", and is followed by the number "0101" (the number "10" in binary), indicating that 10 further bits of value "1" follow, thus constituting a saving of 6 bits stored (the ten bits that would have been stored in the absence of compression, less the four that are required in order to indicate the presence of these ten in uncompressed data).

Referring once again to FIG. 1, in the present example the source data is a file created by suitable word processing software, and is stored in the first instance at the computer 100. A user of the computer 100 wishes to obtain a printed form of the document created using the word processing software from the printer 300 as a result of its geographical location. The printer 300 and the computer 100 are linked via two distinct network pathways: a first pathway in the form of the direct network link 600, and a second pathway provided by the combination of link 400 from the computer 100 to printer 200 together with the link 500 from printer 200 to printer 300. The intrinsic nature of the links is such that, for a given signal to noise ratio during data transmission, the links 500 and 600 are capable of providing data transmission at the same speed, whereas the link 400 is only capable of providing data transmission at a substantially lower rate.

To obtain a printed document at the printer 300 a user of the desktop computer 100 therefore has a number of choices: source data in the form of the word processing file may be transmitted directly to the printer 300 via the direct, relatively high-speed link 600; or it may be transmitted initially to the printer 200 via the relatively low-speed link 400, and then on to the printer 300 via the high-speed link 500. Furthermore, in the case of the second of the two alternative courses of action referred to above, the user has the option of performing one or more of the print pipeline operations (such as transformation into PCL and ripping) at printer 200, with ripped data then being sent from printer 200 on to the printer 300 using a RIPNPRINT function as disclosed in our co-pending European patent application No. 01300824.8, the contents of which are hereby incorporated by reference. The choice between these alternatives will depend upon the policy according to which a user is operating. Thus for example, it may be that, in accordance with the policy of the user, the dominant factor in determining the most beneficial course of action is cost. Alternatively, it may be that speed or quality are dominant factors. Frequently a policy will encompass two or more, and quite possibly conflicting requirements, such as speed or quality on one hand and cost on the other. In order to arrive at a decision implementing the policy of the user, the alternative courses of action available to the user are evaluated in view of the policy, and the most suitable course of action in accordance with the predetermined policy is selected.

In the present illustrated example the policy requirement is simply for speed of printing at printer 300. In the event that the data link 600 is capable of transmitting the data at its maximum rate, and that the printer 300 is capable of operating upon the source data immediately upon receipt to generate a printed document, a printed document will be generated most rapidly simply by dispatching source data in the form of a word processing data file directly to the printer 300 via the link 600. However, in a network where traffic along network links, and use of various appliances such as printer 300 may be invoked from a number of users other than the computer 100, it is not necessarily the case that the source data may be transmitted along the link 600 at the maximum speed, or that the printer 300 will necessarily be available to operate upon the source data (e.g. to rip it) at its maximum intrinsic speed, or that the printer 300 will be able to operate on the source data immediately. As a consequence therefore, it may be that the most rapid route and processing manner for transmission and processing of the source data resident at computer 100 is one of the alternative courses of action outlined above. Moreover, it may be that, for example as a result of the demands on the network, waiting a short period of time prior to commencing the operation of transmitting and processing data provides a worthwhile benefit in processing time (or any other factor outlined in the policy, such as cost).

In the case of network printing, depending upon the network, all printing operations within the network may be managed by a central "omniscient" print management programme, in which case the probable outcome of a given alternative course of action may be evaluated analytically using knowledge of the network traffic between printers, the various jobs allocated to a given printer at a given time etc.. Frequently however there is no central controlling print management programme, and the probable outcome of a given proposed course of action is advantageously determined using known statistical analysis techniques, which use historical data of events to predict future outcomes.

Figure 3A:
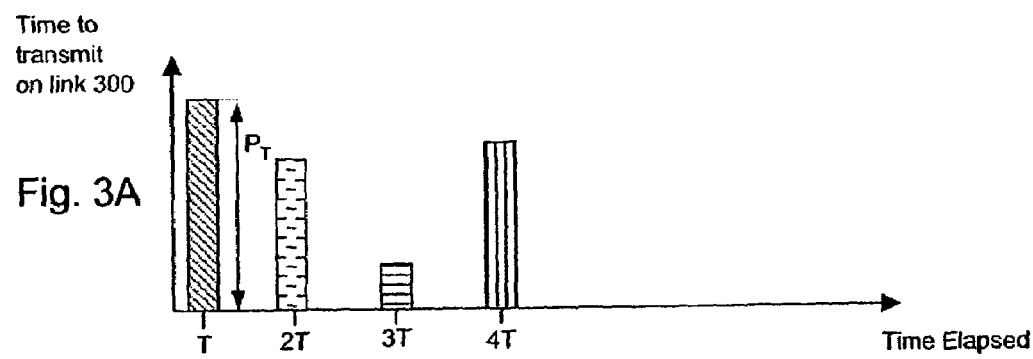
FIGS. 3A–D are graphs illustrating the process of establishing a rating for transmission of data along one network pathway.
Figure 3B:
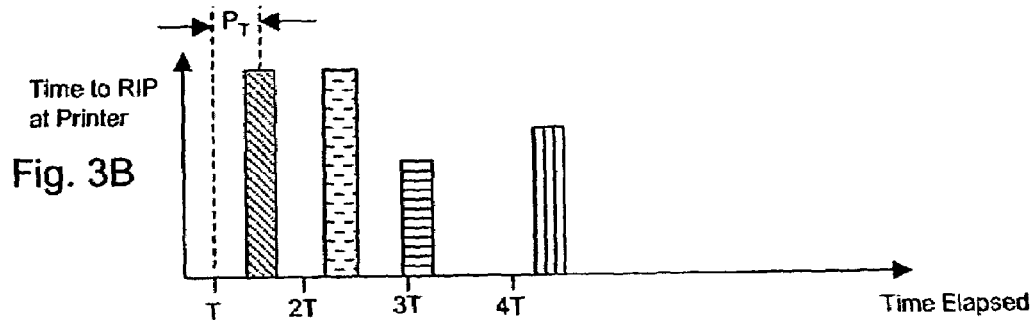
Figure 3C:
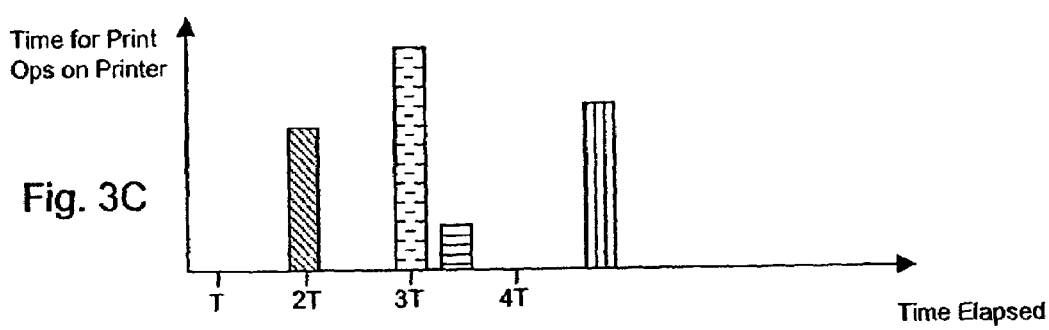
Figure 3D:
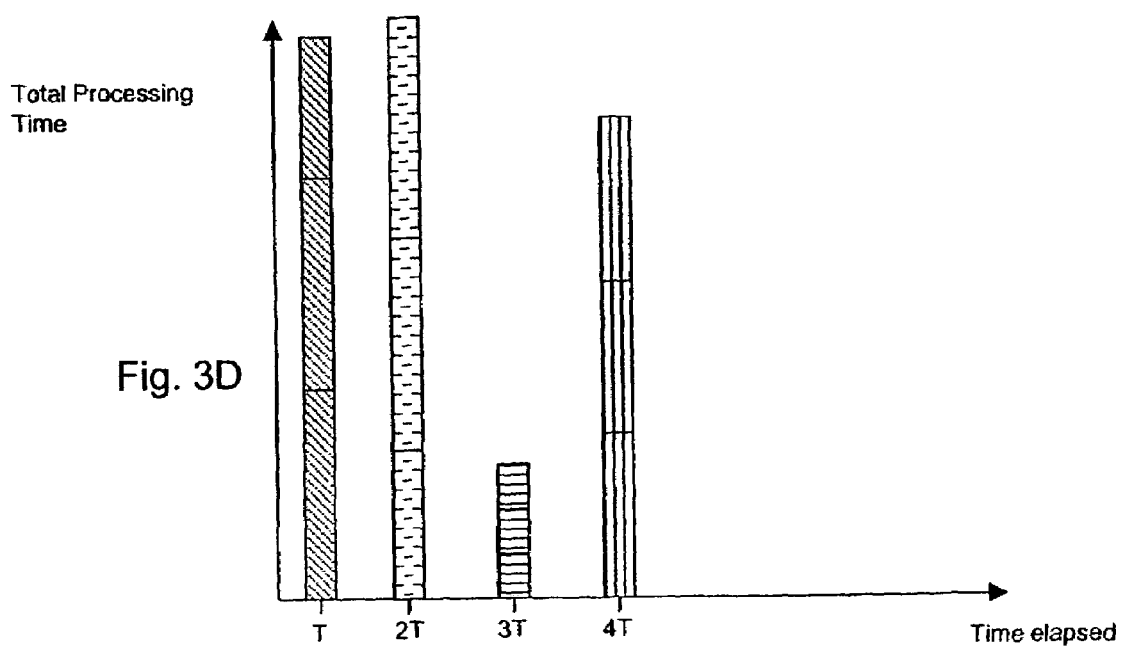

Referring now to FIGS. 3A–C, a simplified illustration of results of analysis predicting the probable outcome of each of the individual steps involved in dispatching a word processing file directly along relatively high-speed link 600 for processing and printing at the printer 300 is illustrated in graphical form. FIG. 3A illustrates the probable time required in order to transmit the word processing source data file along the link 600 at a number of different instances in time, i.e. at a number of different "start times". Thus the abscissa in FIGS. 3A–D represents the passage of time starting from some time shortly in the future at which the process may commence (subsequent to the process of evaluating the alternative courses of action). From FIG. 3A it can be seen that the time required to transmit the source data along the link 600 is greatly dependent on the time at which the source data is dispatched; with the shortest predicted time interval occurring at the time 3T on the Time Elapsed axis. The predicted time required to rip the source data at printer 300 is illustrated in FIG. 3B, and it can be seen that the predicted time intervals for the ripping operations start later than those in FIG. 3A, with the difference in the time of commencement along the Time Elapsed axis being equal to the predicted time for completion of the previous data transmitting operation in FIG. 3A. Thus for example analysis predicting the time interval required for the ripping operation at printer 300 provides that the ripping operation does not commence until a time $(T+P_T)$ to allow for the time predicted to be required for transmission of the data shown in FIG. 3a. A similar prediction for the time required for the print operations of printer 300 to operate on the ripped data is then made and illustrated in FIG. 3C, with the predictions once again taking account of the further adjustments in Time Elapsed resulting from the performance of the ripping operation. Once predictions for each of the individual steps involved in the particular course of action under analysis have been completed, the total processing time, generated simply by adding the predicted total processing times for each of the individual steps, is generated for each of the start times T to 4T. The total time required in order to complete the printing operation in each case may then be calculated by adding the start time to the total processing time, in order to establish the quickest predicted time to completion of the printing operation. In the example illustrated in FIG. 3D it can be seen that commencing the operation of transmitting, processing and printing at time 3T yields substantially the shortest processing time, but inherently carries with it a time penalty of waiting until time 3T before starting the operation. By contrast the predicted processing time in the event the operation is commenced at time T is substantially longer, yet starts at time T. Which of the two alternatives provides the most rapid printing thus depends on whether the reduction in processing time at time 3T is greater than the time penalty incurred by the wait (2T) to start the operation.

A similar operation is then performed for each of the other alternative courses of action under consideration, i.e. the transmission of data to the printer 200 and then on to printer 300 with and without performing ripping at the printer 200.

However, as mentioned above, the illustration of this analysis, showing discrete histograms at widely-spaced instances in time is a simplification. In practice the analysis is likely to yield a quasi-continuous (i.e. within the limits of digital processing of data) profile of processing time against time elapsed for each of the activities involved, which are then superposed substantially in the manner illustrated to generate a profile of total processing time against time elapsed. The shortest time to completion of the print job, and the start time required to achieve that may then be determined from that profile. Following determination of this for the transmission of data to printer 300 along data link 600 and ripping and printing at printer 200.

Referring to FIGS. 4A–E, the continuous profiles for processing time of each of: transmission of source data along the relatively slow link 400; ripping of data at printer 200, transmission of ripped data along relatively fast link 500; and printing of the ripped data at the printer 300 are illustrated, together with the profile of Total Processing Time. These profiles are superposed and analysed using the principles elucidated in connection with FIG. 3 to establish the shortest time to printing at printer 300, and the time at which transmission of data to take advantage of this must start. Although the processing steps involved in the alternative illustrated in FIG. 4 combine to yield slower intrinsic combined processing times than those in FIG. 3, external network influences such as other demands on processing and transmission time may act to make the route of FIG. 4 a more attractive alternative. For example, qualitatively, from FIGS. 4A–C it can be seen that the processing time required for transmission of source data, ripping of the data at printer 200 and the transmission of the ripped data along link 500 are all relatively low, and relatively constant. FIG. 4D (being the continuous profile from which the histograms of FIG. 3D were derived) however reveals a window W providing a relatively short processing time for conversion of ripped data into printed document at the printer 200. If, for example, data may not be transmitted along the link 600, or the source data may not be ripped in sufficient time (whether—in accordance with an alternative not discussed in detail—at desktop computer 100, or the printer 300) to take advantage of this window W, it may be that a more preferable alternative involves sending the word processing file to the printer 200 along the relatively slow data link 400, converting the word processing file to PCL and ripping it at the printer 200, and then sending the ripped data to the printer 300 along the relatively fast link 500. This alternative course of action may succeed in getting ripped data to the printer 300 for printing faster than the route of sending the word processing file directly to the printer 300 along the link 600 to take advantage of this window and print the document earlier. Because the data transmitted along the link 400 is the relatively small word processing file, the relatively low speed of the link 400 is less of a hindrance than would be the case when transmitting the much larger file of ripped data, for example, which may be transmitted along the relatively fast link 500.

Once analysis of the type discussed above (or an alternative method of analysis) has been completed to yield, in relation to each alternative route, the shortest time to completion of the job (as defined by the analysis), the alternative providing the earliest probable completion is selected in accordance with the policy requiring speed to completion of printed copy at printer 300.

In the event that policy requires a secondary consideration such as cost to be taken into account (because for example of the different costs of ripping data at different printers and use of various network links) this may be factored in by analysing the cost of each alternative under consideration, and then weighting each of the alternatives according to relative cost and the relative importance of cost to speed. Thus for example consider a case where two alternatives are under consideration having a total time to printing of 5 and 7 seconds, and a cost of 160 and 80 respectively. The relative cost of these alternatives is 2 and 1 respectively, but in accordance with predetermined policy, cost is only weighted with ⅕ of the importance of speed, resulting in a reduction in the relative spread of cost to 1.2 and 1 respectively. Multiplying the total time to printing by the weighted relative cost thus yields the final ratings in accordance with policy of 6 (i.e. 5×1.2) seconds and 7 seconds respectively. Thus, in this example, because of the relative weighting of cost and speed, the substantial difference in cost has had only an insufficiently large effect to alter the relative ratings of the two alternatives.

In the illustrated embodiment, each of the ratings, which are predictions of the length of time transmission and processing of the data will take, are derived following a consideration of a plurality of scenarios, i.e. the different times at which the data may be dispatched. Ratings may be generated by consideration of differing scenarios in which the effect of variations in a different parameter which may be varied (e.g. the format of the source data) are considered in order to get the best possible rating.

The present invention has been illustrated in the context of a printing operation. However it is equally applicable to other multi-stage or multi-process operations within a network, such as the encryption, decryption and authorisation of message, for example. Thus decryption of a session key encrypted to a public key may take place at one computing entity within an intranet, with the decrypted session key and the message encrypted to it being passed to another entity, such as for example the entity for whom the message is intended.

The invention claimed is:

1. A method of optimising performance of a multi-stage service on source data in a network having first and second computing entities linked by first and second network pathways enabling, for a given ratio of signal to noise, data transmission at higher and lower rates respectively, comprising the steps of:
   establishing, on the basis of predetermined policy:
   (i) a first rating for transmitting the source data from the first to the second computing entity via the first network pathway and performance of the multi-stage service by the second computer entity, the first rating being based at least in part upon a probable time interval for transmission of the source data along the first pathway and a probable time interval for performance of the multi-stage service by the second computing entity; and
   (ii) a second rating for transmitting the source data to a third computing entity located on the second pathway, performing at least a part of the multi-stage service at the third computing entity, subsequently transmitting intermediate data to the second computing entity along the second pathway, and performing any remaining stages of the service by the second computing entity, the second rating being based at least in part upon a sum of (i) a probable time interval for transmission of the source data from the first to the third computing entity, (ii) a probable time interval for performance of at least a part of the multi-stage service on the source data to create the intermediate data by the third computing entity, (iii) a probable time interval for transmission of the intermediate data from the third to the second computing entity, and (iv) a probable time interval for performance of remaining parts of the multi-stage service by the second computing entity; and
   selecting the pathway with the most favourable rating.

2. A method according to claim 1 wherein the predetermined policy relates favourable ratings to rapid completion of the multi-stage service at the second computing entity.

3. A method according to claim 1 wherein the steps of establishing the first and second ratings include the steps of performing statistical analysis of historical data.

4. A method according to claim 3 wherein the historical data relates at least to a time interval required to complete an activity and a time at which the aforesaid activity occurred.

5. A method according to claim 1 wherein the second pathway includes a first data link from the first to the third computing entity, and a second data link from the third to the second computing entity, and wherein the first data link enables, for the given level of signal to noise, a lower rate of transmission of data than the second data link.

6. A method according to claim 5 wherein performance by the third computing entity of at least a part of the multi-stage service results in transformation of source data to intermediate data, and the size of the intermediate data is greater than the size of the source data.

7. A method according to claim 6 wherein the multi-stage service optionally includes the step of storing data by the third computing entity at least until transmission thereof to the second computing entity.

8. A method according to claim 7 wherein the data stored by the third computing entity is dispatched to the second computing entity when it is established that the second computing entity will, on receipt of the data, either be able to perform one or more parts of the multi-stage service or store the data.

9. A method according to claim 8 wherein the data stored by the third computing entity is intermediate data.

10. A method according to claim 6 wherein the multi-stage service is printing and the intermediate data is a file of ripped data.

11. A method according to claim 1 wherein the policy relates favourable ratings to advantageous pecuniary cost for completion of the multi-stage service at the second computing entity.

12. A method according to claim 1 wherein the multi-stage service is printing of a document from source data.

13. A method according to claim 1 further comprising the step of comparing a plurality of scenarios of transmission of data along the first network pathway and performance of the multi-stage service, and selecting the scenario having a most favourable rating.

14. A method according to claim 13 wherein the plurality of scenarios are provided by considering transmission of data along the first pathway and performance of the multi-stage service by the second computing entity at a plurality of different instances in time.

15. A method according to claim 13 wherein the plurality of scenarios are provided by considering transmission of data along the first pathway and performance of the multi-stage service by the second computing entity in a plurality of data formats.

16. A method of optimising performance of a multi-stage service on source data in a network having first and second computing entities linked by first and second network pathways enabling, for a given ratio of signal to noise, data transmission at higher and lower rates respectively, comprising the steps of:

establishing, on the basis of predetermined policy:

(i) a first rating for transmitting the source data from the first to the second computing entity via the first network pathway and performance of the multi-stage service by the second computer entity, the first rating being based at least in part upon a probability of achieving a maximum intrinsic data transmission rate achievable along the first pathway, a probability of achieving a maximum intrinsic speed of performance of the multi-stage service by the second computing entity; and (ii) a second rating for transmitting the source data to a third computing entity located on the second pathway, performing at least a part of the multi-stage service at the third computing entity, subsequently transmitting intermediate data to the second computing entity along the second pathway, and performing any remaining stages of the service by the second computing entity, the second rating being based at least in part upon a probability of achieving a maximum intrinsic data transmission rate achievable along the first pathway, a probability of achieving a maximum intrinsic speed for performance of at least a part of the multi-stage process by the third computing entity, a probability of achieving a maximum intrinsic processing speed of performance of remaining parts of the multi-stage process by the second computing entity; and selecting the pathway with the most favourable rating.

17. A method according to claim 16 wherein the predetermined policy relates favourable ratings to rapid completion of the multi-stage service at the second computing entity.

18. A method according to claim 16 wherein the step of establishing the first and second ratings include the steps of performing statistical analysis of historical data.

19. A method according to claim 18 wherein the historical data relates at least to a time interval required to complete an activity and a time at which the aforesaid activity occurred.

20. A method according to claim 16 wherein the second pathway includes a first data link from the first to the third computing entity, and a second data link from the third to the second computing entity, and wherein the first data link enables, for the given level of signal to noise, a lower rate of transmission of data than the second data link.

21. A method according to claim 20 wherein performance by the third computing entity of at least a part of the multi-stage service results in transformation of source data to intermediate data, and the size of the intermediate data is greater than the size of the source data.

22. A method according to claim 21 wherein the multi-stage service includes the step of storing data by the third computing entity at least until transmission thereof to the second computing entity.

23. A method according to claim 22 wherein the data stored by the third computing entity is dispatched to the second computing entity when it is established that the second computing entity will, on receipt of the data, either be able to perform one or more parts of the multi-stage service or store the data.

24. A method according to claim 23 wherein the data stored by the third computing entity is intermediate data.

25. A method according to claim 21 wherein the multi-stage service is printing and the intermediate data is a file of ripped data.

26. A method according to claim 16 wherein the policy relates favourable ratings to advantageous pecuniary cost for completion of the multi-stage service at the second computing entity.

27. A method according to claim 16 wherein the multi-stage service is printing of a document from source data.

28. A method according to claim 16 further comprising the step of comparing a plurality of scenarios of transmission of data along the first network pathway and performance of the multi-stage service, and selecting the scenario having a most favourable rating.

29. A method according to claim 28 wherein the plurality of scenarios are provided by considering transmission of data along the first pathway and performance of the multi-stage service by the second computing entity at a plurality of different instances in time.

30. A method according to claim 28 wherein the plurality of scenarios are provided by considering transmission of data along the first pathway and performance of the multi-stage service by the second computing entity in a plurality of data formats.

31. A method according to claim 16 wherein the probability of achieving a maximum intrinsic data transmission rate achievable along the first pathway and the probability of achieving a maximum intrinsic speed of performance of the multi-stage service by the second computing entity are combined to obtain a first total probability of achieving a first maximum intrinsic speed of performance of the multi-stage service.

32. A method according to claim 31 wherein the probability of achieving a maximum intrinsic data transmission rate achievable along the first pathway, the probability of achieving a maximum intrinsic speed for performance of at least a part of the multi-stage process by the third computing entity, the probability of achieving a maximum intrinsic processing speed of performance of remaining parts of the multi-stage process by the second computing entity are combined to obtain a second total probability of achieving a second maximum intrinsic speed of performance of the multi-stage service.

* * * * *